United States Patent [19]

Blong et al.

[11] Patent Number: 5,527,858
[45] Date of Patent: Jun. 18, 1996

[54] MELT-PROCESSABLE FLUOROPLASTIC

[75] Inventors: Thomas J. Blong, Woodbury, Minn.;
Claude Lavallée, London, Canada

[73] Assignee: Minnesota Mining and Manufacturing Company, St. Paul, Minn.

[21] Appl. No.: 300,310

[22] Filed: Sep. 2, 1994

[51] Int. Cl.$^6$ ............... C08L 27/16; C08L 27/18; C08L 27/20; C08L 71/02
[52] U.S. Cl. ............... 525/187; 524/377; 524/378
[58] Field of Search ............... 525/187; 524/377, 524/378; 526/254

[56] References Cited

U.S. PATENT DOCUMENTS

| | | | |
|---|---|---|---|
| 4,013,622 | 3/1977 | DeJuneas et al. | 260/45.95 S |
| 4,129,717 | 12/1978 | Praetorius | 525/187 |
| 4,159,975 | 7/1979 | Praetorius et al. | 525/91 |
| 4,670,503 | 6/1987 | Newmann et al. | 524/520 |
| 4,855,360 | 8/1989 | Duchesne et al. | 525/187 |
| 4,956,225 | 9/1990 | Malhotra | 428/518 |
| 5,055,539 | 10/1991 | Hengel | 526/254 |
| 5,284,184 | 2/1994 | Noone et al. | 138/121 |

FOREIGN PATENT DOCUMENTS

| | | | |
|---|---|---|---|
| 571807 | 12/1993 | European Pat. Off. | |
| 006231 | 1/1984 | Japan | |
| 159410 | 7/1986 | Japan | 526/254 |

OTHER PUBLICATIONS

"Grant and Hackh's Chemical Dictionary" 5th edition p. 290.
Brydson, J. A., Chap. 5, "Flow Properties of Polymer Melt," Van Nostrand Reinhold Co., New York (1970).
Rauwendaal, C., "Polymer Extrusion," Hansen Publishers, p. 23–48 (1986).

*Primary Examiner*—David Buttner
*Attorney, Agent, or Firm*—Gary L. Griswold; Walter N. Kirn; John A. Burtis

[57] ABSTRACT

This invention provides a melt-processable fluoroplastic composition comprising a blend of a melt-processable thermoplastic fluoropolymer component of interpolymerized units derived from vinylidene fluoride and at least one ethylenically-unsaturated, copolymerizable, fluorinated comonomer, and a hydrocarbon polymer component comprising poly(oxyalkylene). The composition is useful for making shaped articles including tubing or film.

17 Claims, No Drawings

MELT-PROCESSABLE FLUOROPLASTIC

This invention relates to thermoplastic fluoropolymer compositions, their preparation and use, and to shaped articles, such as films and tubing, made by melt-processing said compositions, for example, by extrusion thereof. In another aspect, this invention relates to improving flow properties of thermoplastic fluoropolymer compositions used to make extruded shaped articles thereof so as to make them at fast extrusion rates and with reduced melt defects, such as melt fractures.

A relatively new class of fluoropolymers which has become commercially available is the thermoplastic, chemically resistant, thermally stable, optically clear, low permeabile terpolymers of tetrafluoroethylene, hexafluoropropylene, and vinylidene fluoride comonomers combined in different ratios to get a range of different melting points. These fluoropolymers are more flexible and can be melt-processed at lower temperatures than most other fluoroplastics, such as polyvinylidene fluoride and ethylene-tetrafluoroethylene copolymers. A series or family of these fluoropolymers are sold as "3M THV Fluoroplastics" by the 3M Company and can be used to prepare, for example, molded parts and extruded films, tubing, and profiles. Because these fluoropolymers are more flexible than other melt-processable fluoroplastics, can be easily bent or shaped, and have low permeability, they find particular use as permeation barriers in automotive fuel lines, vapor recovery lines, and fill or vent hoses. While these fluoroplastics have many advantageous performance and processing properties, we have found that under some melt-processing conditions some of these fluoroplastics form extrudates whose surfaces are undesirably rough or exhibit a melt fracture in the form of surface irregularity known in polymer melt technology as "sharkskin"—see, for example, Brydson, J. A., Chap. 5, "Flow Properties of Polymer Melt," Van Nostrand Reinhold Co., New York (1970). Such defective surfaces make such extrudates less suitable for use as fuel line hose or catheters where surface smoothness is important to the utility of such shaped articles. Specifically, smoothness is a requirement for catheters to ensure uniform liquid flow therethrough and to allow smooth insertion of wires or probes. In fuel line hose, a smooth surface is preferred to allow laminar liquid flow and to obtain a low permeation rate.

We have discovered that by blending melt-processable, thermoplastic fluoropolymers of vinylidene fluoride and one or more ethylenically-unsaturated comonomers, such as the above-described 3M THV Fluoroplastics, with small amounts of some poly(oxyalkylene) polymer, such as polyethylene glycol, the resulting blends can be melt processed at relatively low melt temperatures with improved flow properties, such as relatively low shear stress, to readily form extrudates with desired smooth surfaces which enable or enhance their uses where such properties, coupled with retained fluoropolymer properties, are desired or required, such as in fuel line hose or tubing. These improvements are obtained without the need, for example, to modify the chemical structure of the fluoropolymer, to raise the melt-processing temperature, or to extrude at lower line speeds or shear rates—measures sometimes resorted to in melt processing plastics to reduce melt fracture.

According to an aspect of this invention, a melt-processable fluoroplastic composition is provided which comprises a blend of (a) a fluoropolymer component which is a major amount, i.e., greater than 50% by weight of the composition, and is a melt-processable, thermoplastic fluoropolymer of interpolymerized units derived from vinylidene fluoride and at least one ethylenically-unsaturated, copolymerizable, fluorinated comonomer such as (1) fluorinated alpha-olefins represented by the formula $R_fCF=CF_2$, where $R_f$ is H, F, Cl, or a perfluoroalkyl of 1 to 8, preferably 1 to 3, carbon atoms, and, (2) optionally, minor amounts (i.e., less than 50% by weight of said fluoropolymer) of perfluoro(alkyl vinyl ether) having, for example, 1 to 4 carbon atoms, such as perfluoro(methyl vinyl ether), and/or low molecular weight alpha-olefin, e.g., ethylene and propylene, said fluoropolymer being in the form of a matrix in which is dispersed (b) a small amount, (i.e., less than 20% by weight of said composition) of a hydrocarbon polymer component comprising poly(oxyalkylene) polymer, such as a polyethylene glycol, which is dispersed in said fluoropolymer matrix.

In another aspect, this invention provides a method of making a shaped article of such melt-processable fluoroplastic compositions. That method comprising blending (a) a major amount of a melt-processable, thermoplastic fluoropolymer component of interpolymerized units derived from vinylidene fluoride and at least one ethylenically-unsaturated, copolymerizable, fluorinated comonomer, and (b) a small amount of a hydrocarbon polymer component comprising poly(oxyalkylene)polymer, and melt-processing the resulting blend to form said article.

The hydrocarbon polymer component, used as a blend component in making the melt-processable fluoroplastic compositions of this invention, is a non-fluorinated polymer (and characterizing it as "hydrocarbon" distinguishes it from the fluoropolymer blend component). The hydrocarbon polymer component is fluid at the melt-processing temperature of the fluoropolymer, for example, 180° to 280° C., and is liquid, or preferably solid at ambient temperature, e.g., 20° C., where the fluoropolymer component is solid. The hydrocarbon polymer component and the fluoropolymer component are immiscible, as evidenced, for example, under optical microscopic examination or by the cloudy, white, or opaque appearance of extrudates of the blend composition when the composition does not contain some adjuvant, such as filler, which imparts a color to the composition. The extrudates essentially retain properties of the fluoropolymer component, such as thermal stability, e.g., at 220°–280° C., but, as compared to extrudate thereof, exhibit improved melt processability or extrusion behavior in that the extrudates of the blend composition of this invention can be extruded at higher output rates or faster rates for a given extrudate shape and at much higher shear rates with much reduced shear stress, and the extrudates have good quality surfaces, particularly smoothness, and are otherwise relatively free of objectionable melt defects or fracture, such as "sharkskin."

Preferably the above-described fluoropolymers used in this invention are those hydrogen-containing thermoplastics having an ASTM D1238 melt index of less than 1000 g/min. measured at 265° C. with a loading of 5 kg and are melt extrudable at 250° C.

Preferred in preparing the blends of this invention are those fluoropolymers having at least 5 wt % of units derived from vinylidene fluoride and more than 25 wt % of their units derived from a combination of tetrafluoroethylene and hexafluoropropylene such that the fluoropolymers have an amount of fluorine below 75 wt % and are melt-extrudable thermoplastics.

A preferred class of the fluoropolymers used in this invention is derived by copolymerizing 30 to 70 wt %, preferably 35 to 65 wt %, tetrafluoroethylene, 10 to 30 wt %, preferably 15 to 25 wt %, hexafluoropropylene, and 10 to 50 wt %, preferably 15 to 45 wt %, vinylidene fluoride. A subclass of the fluoropolymer useful in making blends of this invention are fluoroplastics which contain interpolymerized units derived from copolymerization of a monomer charge of 45 to 65 wt % tetrafluoroethylene, 10 to 20 wt % hexafluoropropylene, and 20 to 35 wt % vinylidene fluoride. The fluoropolymers of this class, described in U.S. Pat. No. 4,670,503 (Newmann et al.), having melting points of 130° to 170°, measured by Differential Scanning Calorimetry and an ASTM D 1238 melt index of 50 to 250 g/10 min. measured at 265° C. and a loading of 5 kg. Commercial fluoropolymers which can be used are said THV Fluoroplastics which are described in product bulletins 98 0211-7703-9(103.02)R1, 98 0211-7010-9, -7011-7, -7012-6, -7013-3, -7014-1, and -8100-7 of the 3M Company. Grades THV 200, THV 400, and THV 500 of these fluoroplastics have ASTM D 3418 melting ranges of 115°–125° C. 150°–160° C. and 165°–180° C., respectively, and ASTM D 1238 melt flow indices of 20, 10, and 10, respectively, at 265° C. and 5 kg. The descriptions of said THV Fluoroplastics in said product bulletins are incorporated herein by reference.

The poly(oxyalkylene) polymers, useful in this invention, can include poly(oxyalkylene) polyols and their derivatives. A class of such poly(oxyalkylene) polymers can be represented by the general formula:

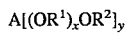

$$A[(OR^1)_x OR^2]_y$$

where A is an active hydrogen-free residue of a low molecular weight, initiator organic compound having a plurality of active hydrogen atoms (e.g., 2 or 3), such as a polyhydroxyalkane or a polyether polyol, e.g., ethylene glycol, glycerol, 1,1,1-trimethylol propane, and poly(oxypropylene) glycol; y is 2 or 3; the $(OR^x)_x$ is a poly(oxyalkylene) chain having a plurality of oxyalkylene groups, $(OR^1)$, wherein the $R^1$ moieties can be the same or different and are selected from the group consisting of $C_1$ to $C_5$ alkylene radicals and, preferably, $C_2$ or $C_3$ alkylene radicals, and x is the number of oxyalkylene units in said chain. Said poly(oxyalkylene) chain can be a homopolymer chain, e.g., poly(oxyethylene) or poly(oxypropylene), or can be a chain of randomly distributed (i.e., a heteric mixture) oxyalkylene groups, e.g., a copolymer of —$OC_2H_4$— and —$OC_3H_6$— units, or can be a chain having alternating blocks or backbone segments of repeating oxyalkylene groups, e.g., a polymer comprising $-(OC_2H_4)_a$- and $-(OC_3H_6)_b$- blocks, wherein a+b=5 to 5000 or higher, e.g., 20,000 or more, and preferably 10 to 500. $R^2$ is H or an organic radical, such as alkyl, aryl, or a combination thereof such as aralkyl or alkaryl, and may contain O or N hetero atoms For example, $R^2$ can be methyl, butyl, phenyl, benzyl, and acyl groups such as acetyl ($CH_3CO$—), benzoyl ($C_6H_5CO$—) and stearyl ($C_{17}H_{35}CO$—).

Representative poly(oxyalkylene) polymer derivatives can include poly(oxyalkylene) polyol derivatives wherein the terminal hydroxy groups have been partly or fully converted to ether derivatives, e.g., methoxy groups, or ester derivatives, e.g., stearate groups, ($C_{17}H_{35}COO$—). Other useful poly(oxyalkylene) derivatives are polyesters, e.g., prepared from dicarboxylic acids and poly(oxyalkylene) glycols. Preferably, the major proportion of the poly(oxyalkylene) polymer derivative by weight will be the repeating oxyalkylene groups, $(OR^1)$.

Said poly(oxyalkylene) polyols and their derivatives can be those which are solid at room temperature and have a molecular weight of at least about 200 and preferably a molecular weight of about 400 to 20,000 or higher, e.g., 200,000 or more.

Poly(oxyalkylene) polyols useful in this invention include polyethylene glycols which can be represented by the formula $H(OC_2H_4)_nOH$, where n is about 15 to 3000, such as those sold under the trademark Carbowax, such as Carbowax™ PEG 8000, where n is about 181, and those sold under the tradename Polyox, such as Polyox™ WSR N-10 where n is about 2272.

Two or more of the above-described poly(oxyalkylene) polymers can be used as blend component (b) or one or more of such polymers can be used together with a hydrocarbon olefin polymer of ethylene or propylene, as blend component (b), each polymer being, for example, 5 to 95 wt % of the hydrocarbon blend component (b).

The hydrocarbon olefin polymer can be a homopolymer of ethylene or propylene, or a copolymer of them with each other or either or both of them with other ethylenically-unsaturated comonomers, such as alpha-olefins, e.g., 1-octene. These hydrocarbon olefin polymers, that are optionally used with the poly(oxyalkylenes) as blend component (b), preferably have a melt viscosity which matches or is about the same as the melt viscosity of the fluoropolymer component (a), said hydrocarbon olefin polymer also being dispersed in fluoropolymer matrix.

The hydrocarbon olefin polymer used in this invention together with the poly(oxyalkylene) in a small amount as the hydrocarbon blend component can be a polymer obtained by the homopolymerization of ethylene or propylene or the copolymerization of them with each other or either or both of them with one or more higher alpha-olefins and up to about 30 wt %, but preferably 20 wt % or less, of one or more ethylenically-unsaturated comonomers which are copolymerizable with such olefins, e.g., vinyl ester compounds such as vinyl acetate. Said olefins can be represented by the general structure $CH_2=CHR$, where R is a hydrogen or an alkyl radical which contains not more than 10 carbon atoms and preferably 1 to 6 carbon atoms. Representative olefins are ethylene, propylene, 1-butene, 1-hexene, 4-methyl-1-pentene, and 1-octene. Representative monomers which are copolymerizable with said olefins are vinyl esters, such as vinyl acetate, vinyl propionate, vinyl butyrate, vinyl chloroacetate, and vinyl chloropropionate; vinyl alcohol; acrylic and alpha-alkyl acrylic acids and their alkyl esters, amides, and nitriles, such as acrylic acid, methacrylic acid, ethacrylic acid, methyl acrylate, ethyl acrylate, N,N-dimethyl acrylamide, methacrylamide, and acrylonitrile; vinyl aromatics, such as styrene, o-methoxystyrene, p-methoxystyrene, and vinyl naphthalene; vinyl and vinylidene halides, such as vinyl chloride, vinylidene chloride, vinylidene bromide; alkyl esters of maleic and fumaric acids and anhydrides such as dimethyl maleate, diethyl maleate, and maleic anhydride; vinyl alkyl ethers, such as vinyl methyl ether, vinyl ethyl ether, vinyl isobutyl ether, and 2-chloroethyl vinyl ether; vinyl pyridine; N-vinyl carbazole; N-vinyl pyrolidone; and dienes, such as 1,3-butadiene. The hydrocarbon olefin polymers also can be the metallic salts of said olefin copolymers, or blends thereof, which contain free carboxylic acid groups. Illustrative of the metals which can be used to provide the salts of said carboxylic acid polymers are the mono-, di-, and tri-valent metals such as sodium, lithium, potassium, calcium, magnesium, aluminum, barium, zinc, zirconium, beryllium, iron, nickel, and cobalt. Representative examples of hydrocarbon olefin polymers useful in this invention are polyethylene, polypropylene, and copolymers of ethylene and with propylene with one another and/or 1-butene, 1-hexene, 4-methyl-1-pentene, or 1-octene.

Representative blends of olefin hydrocarbon polymers useful in this invention are blends of polyethylene and polypropylene, low-density polyethylene and high-density polyethylene, and polyethylene and olefin copolymers containing said copolymerizable monomers, some of which are described above, e.g., ethylene and acrylic acid copolymers; ethylene and methyl acrylate copolymers; ethylene and ethyl acrylate copolymers; ethylene and vinyl acetate copolymers, and ethylene, acrylic acid, and vinyl acetate copolymers.

The preferred olefin hydrocarbon polymers are thermoplastic polymers which are homopolymers of ethylene and copolymers of ethylene with 1-butene, 1-hexene, 1-octene, 4-methyl-1-pentene, and propylene.

Commercially available hydrocarbon olefin polymers which can be used in this invention include Escorene™ LL-3001.00, LL-5202, LD411.09, and LD760.36 polyethylenes, Iotek™ 7030 ionomer, and Escor™ ATX310 acid terpolymer, all from Exxon Chem. Co.; ER1833 polyethylene from Chevron Chemical Co.; Novapol™ TF 0119F polyethylene from Novacor Chemicals Inc.; Dowlex™ 2047 polyethylene from Dow Chemical Co.; Marlex™ HMN 4550 polyethylene from Phillips 66 Co.; 3374X polypropylene from Fina Oil and Chemical Co.; and Polysar™ EPM 306 and EPDM 345 ethylene, propylene rubbers from Miles, Inc., Polysar Rubber Div.

The hydrocarbon olefin polymer preferably has a melt flow between 0.01 and 1000, more preferably between 0.1 and 100, g/10 min. as measured by ASTM D 1238 at 190° C. and 2.16 kg. A preferred hydrocarbon olefin polymer is polyethylene.

The hydrocarbon olefin polymer to be used in conjunction with the poly(oxyalkylene) polymer preferably has a melt viscosity which matches or is about the same as the melt viscosity of the fluoropolymer. The hydrocarbon olefin polymer can be selected such that the ratio of its melt viscosity to the melt viscosity of the fluoropolymer is in the range of 0.01/1 to 10/1 and more preferably in the range of 0.1/1 to 1/1. For such ratio, the viscosities of the two polymers are determined under the same conditions that are representative of those at which the blend of components (a) and (b) will be melt-processed.

Some blends of the components may require a larger amount of a particular hydrocarbon polymer component (b) than other hydrocarbon polymers in order that the extrudate have a smooth surface. And some hydrocarbon polymers, such as the hydrocarbon olefin polymers which contain polar moieties derived from polar comonomers, or those polymers with low thermal stability, may impart an unacceptable color to the extrudate for applications of the extrudate which require a colorless or clear extrudate.

The lower limit of amount of the hydrocarbon polymer component (b) to be blended with the fluoropolymer component (a) will generally be an amount at which an increase in extrusion rate of the blend occurs before surface defects are observed in extrudates of the blend, as compared to the same fluoropolymer that is not blended with the hydrocarbon component (b). Generally, the amount of the hydrocarbon polymer component will be about 0.01 to 10 wt %, more preferably about 0.05 to 5 wt %, and most preferably about 0.1 to 1 wt %, by weight of the fluoropolymer-hydrocarbon polymer blend. Increasing concentrations of the hydrocarbon polymer generally decrease the clarity of the extrudates.

The blends of fluoropolymer and hydrocarbon polymer components (a) and (b) can be prepared by blending means usually used in the plastics industry, such as compounding mill, a Banbury mixer, or a mixing extruder in which the hydrocarbon polymer is uniformly distributed throughout the fluoropolymer. The fluoropolymer and the poly(oxyalkylene)polymer may be used in the form, for example, of powders, pellets, or granules. The mixing operation is conveniently carried out at a temperature above the melting point of the polymers. It is also feasible to dry-blend the two polymers in the solid state as particulates and then cause uniform distribution of the hydrocarbon polymer by passing the blend through a twin-screw melt extruder.

The resulting melt blended mixture of fluoropolymer and hydrocarbon polymer can be pelleted or otherwise comminuted into desired particulate size and fed to the extruder, which will typically be a single-screw extruder, which melt-processes the blended mixture for example, at 180° to 280° C., depending upon the melting point, melt viscosity, and thermal stability of the blend. Different types of extruders which can be used to extrude the fluoroplastic compositions of this invention are described, for example, by Rauwendaal, C., "Polymer Extrusion," Hansen Publishers, p. 23–48, 1986.

The die design of the extruder can vary, depending on the desired extrudate to be fabricated. For example, an annular die can be used to extrude tubing, useful in making fuel line hose, such as that described in U.S. Pat. No. 5,284,184 (Noone et al.), which description is incorporated herein by reference.

The fluoroplastic blend composition can contain conventional adjuvants such as antioxidants, pigments, and fillers, e.g., titanium dioxide, carbon black, and silica.

EXAMPLES

The following examples illustrate the fluoroplastic compositions and extrudates of this invention and advantages thereof, such as significantly low shear stress and desirable extrudate surface appearance obtained in practicing this invention.

The fluoroplastic used in these examples was commercially available as 3M THV 500 Fluoroplastic, which had interpolymerized units derived from a copolymerization monomer charge of about 20 wt % vinylidene fluoride, 60 wt % tetrafluoroethylene, and 20 wt % hexafluoropropylene.

The poly(oxyalkylene) polymers used in these examples were products commercially available as Carbowax™ and Polyox™ polyethylene glycols from Union Carbide Corp., and are described, for example, in its commercial product bulletin No. F-4772-M-ICD, which is incorporated herein by reference. Table 1 correlates those Carbowax™ or Polyox™ polyethylene glycol products (by their molecular weight) used in the examples with the code number assigned to them.

TABLE 1

| Code No. | Product Name, and Molecular Weight (Number Average) |
|---|---|
| PAO-1 | Carbowax ™ PEG 400, 400 |
| PAO-2 | Carbowax ™ PEG 1450, 1450 |
| PAO-3 | Carbowax ™ PEG 8000, 8000 |
| PAO-4 | Carbowax ™ PEG 20M, 20000 |
| PAO-5 | Polyox ™ WSR N-10, 100000 |

The examples of fluoroplastic compositions of this invention, consisting essentially of a fluoroplastic and a poly(oxyalkylene) polymer, were prepared using the following procedure. To form a masterbatch the poly(oxyalkylene) polymer of a blend was melt mixed at a level of 1 wt % into the fluoroplastic using a Haake Rheomix 3000E mixing bowl. Total batch weight was 400 g. The mixing profile used a 2-minute loading period at 15 rpm followed by a 1 minute ramp to 50 rpm that was maintained for an additional 5 minutes. An initial mixing temperature of 230° C. was decreased after 1 minute to 180° C. and held constant for the remainder of the procedure. This profile was sufficient to obtain a constant final torque that insured uniform mixing. Final blend temperatures were in the range of 190°–210° C. Each resulting masterbatch blend was air-cooled and then chopped into approximately 0.5 inch (1.25 cm.) cubes. The appropriate amount of the masterbatch blend was then remixed into the balance of the fluoroplastic using the above procedure in order to obtain the final desired level of poly(oxyalkylene) polymer in the finished blend. Chopped samples of the finished blend were ground prior to extrusion to facilitate feeding of the capillary rheometer. Rheological measurements were performed to determine the shear stress of the fluoroplastic compositions at various shear rates, and the reduction in shear stress due to the presence of the poly(oxyalkylene) polymer in the composition. Measurements were conducted using an Instron 4202 system with a 3210 Capillary Rheometer. The capillary die had a flat entry with a L/D ratio of about 40/1 and a diameter of 20.5 mils (0.521 mm). Shear stress measurements were made at 200 $s^{-1}$. Samples were extruded at 230° C. following a 10 min. dwell time. Microscopic examination of the air-cooled extrudates was used for visual determination of surface appearance on the extrudate.

Each fluoroplastic blend sample was extruded at several constant shear rates until equilibrium loads were reached. Table 2 sets forth the shear stress for a representative shear rate, 200 $s^{-1}$. After each sample was extruded and measurements completed, the barrel of the rheometer was cleaned with a brass brush and gauze, and the die was cleaned with a piece of metal wire. A fluoroplastic without poly(oxyalkylene) polymer was then run through the capillary at a constant shear rate until the predetermined apparent viscosity for the unmodified fluoroplastic was achieved, thus ensuring that all remnants of the polymer from the previous extrusion had been removed from the instrument.

Table 2 sets forth the composition and properties of a set of thermoplastic extrudate, Ex. 1-9, and that of the control, Ex. C-1. In all these examples, the fluoropolymer used was THV 500 Fluoroplastic.

Various modifications and alterations of this invention will become apparent to those skilled in the art without departing from the scope and spirit of this invention.

What we claim is:

1. A melt-processable fluoroplastic composition comprising a blend of
   (a) a major amount of a melt-processable, thermoplastic fluoropolymer component of interpolymerized units derived from less than or equal to 50 wt % vinylidene fluoride and at least one ethylenically-unsaturated, copolymerizable, fluorinated comonomer, and
   (b) from 0.01 to 20 percent by weight of a polymer component comprising poly(oxyalkylene).

2. A fluoroplastic composition according to claim 1 wherein said fluorinated comonomer is (1) fluorinated alpha-olefin represented by the formula $R_fCF=CF_2$, where $R_f$ is H, F, Cl, or a perfluoroalkyl of 1 to 8 carbon atoms, and, optionally, (2) perfluoro(alkyl vinyl ether) and/or low molecular weight non-fluorinated alpha-olefin.

3. A fluoroplastic composition according to claim 1 wherein said fluoropolymer component is a terpolymer of vinylidene fluoride, tetrafluoroethylene, and hexafluoropropylene.

4. A fluoroplastic composition according to claim 3 wherein said fluoropolymer component has at least 5 wt % of its interpolymerized units derived from vinylidene fluoride and more than 25 wt % of its interpolymerized units derived from a combination of tetrafluoroethylene and hexafluoropropylene, such that the fluoropolymer has an amount of fluorine up to 75 wt %.

5. A fluoroplastic composition according to claim 1 wherein said fluoropolymer component is a thermoplastic terpolymer derived by copolymerizing 30 to 70 wt % tetrafluoroethylene, 10 to 30 wt % hexafluoropropylene, and 10 to 50 wt % vinylidene fluoride.

6. A fluoroplastic composition according to claim 1 wherein said fluoropolymer component has an ASTM D 1238 melt flow index of less than 1000 g/min, measured at 265° C. and 5 kg.

7. A fluoroplastic composition according to claim 1 wherein said poly(oxyalkylene) has the general formula

TABLE 2

| Ex. | Poly(oxyalkylene)-polymer | | Shear stress, @ 200 $s^{-1}$ | Extrudate appearance | |
|---|---|---|---|---|---|
| | Code No. | Level, wt. % | | Light transmission | Surface |
| C-1 | — | 0 | 35.0 psi (241 kPa) | transparent | Sharkskin |
| 1 | PAO-1 | 0.1 | 31.8 psi (219 kPa) | translucent | Sharkskin |
| 2 | PAO-2 | 0.1 | 32.1 psi (221 kPa) | translucent | Sharkskin |
| 3 | PAO-3 | 0.1 | 32.1 psi (221 kPa) | translucent | Partial Sharkskin |
| 4 | PAO-4 | 0.1 | 33.4 psi (230 kPa) | translucent | Sharkskin |
| 5 | PAO-5 | 0.1 | 33.0 psi (228 kPa) | translucent | Sharkskin |
| 6 | PAO-2 | 0.2 | 27.3 psi (188 kPa) | translucent | Smooth |
| 7 | PAO-3 | 0.2 | 28.5 psi (197 kPa) | translucent | Smooth |
| 8 | PAO-4 | 0.2 | 30.0 psi (207 kPa) | translucent | Smooth |
| 9 | PAO-5 | 0.2 | 31.9 psi (220 kPa) | translucent | Partial Sharkskin* |

*When PAO-5 was used at a level of 1 wt %, the extrudate was opaque and smooth.

The data of Table 2 show that the unmodified fluoroplastic, Ex. C-1, exhibited melt fracture. With the addition of poly(oxyalkylene) polymer, a reduction in shear stress during extrusion was obtained and the melt fracture can be eliminated, provided sufficient amounts of the poly(oxyalkylene) polymer are blended into the fluoroplastic matrix.

$A[(OR^1)_xOR^2]_y$, where A is an active hydrogen-free residue of a low molecular weight, initiator organic compound having a plurality of active hydrogen atoms; y is 2 or 3; $(OR^1)_x$ is a poly(oxyalkylene) chain having a plurality of oxyalkylene groups, $(OR^1)$, wherein said $R^1$ moieties can be the same or different and are selected from the group consisting of $C_1$ to $C_5$ alkylene radicals, x is the number of oxyalkylene units, and said poly(oxyalkylene) chain can be a homopolymer chain, or a chain of randomly distributed oxyalkylene groups, or a chain having alternating blocks or backbone segments of repeating oxyalkylene groups; and $R^2$ is selected from the group consisting of H, alkyl, aryl, or combinations thereof.

8. A fluoroplastic composition according to claim 1 wherein said poly(oxyalkylene) polymer is a poly(oxyalkylene) polyol or derivative of a poly(oxyalkylene) polyol.

9. A fluoroplastic composition according to claim 1 wherein said poly(oxyalkylene) polymer is poly(oxyethylene) glycol.

10. A fluoroplastic composition according to claim 9 wherein the molecular weight range of said poly(oxyethylene) glycol is about 400 to 20,000.

11. A fluoroplastic composition according to claim 1 wherein said hydrocarbon polymer component further comprises a polymer of ethylene or propylene.

12. An extrudate comprising the blend of claim 1.

13. An extruded film comprising the blend of claim 1.

14. A tubing comprising the blend of claim 1.

15. A method of making the fluoroplastic composition of claim 1, which comprises blending said components (a) and (b).

16. A method of reducing melt defects of a shaped plastic article which comprises blending (a) a major amount of a melt-processable, thermoplastic fluoropolymer component of interpolymerized units derived from less than or equal to 50 wt % vinylidene fluoride and at least one ethylenically-unsaturated, copolymerizable, fluorinated comonomer, and (b) from 0.01 to 20 percent by weight of a polymer component comprising poly(oxyalkylene) polymer, and melt-processing the resulting blend to form said article.

17. The method according to claim 16 wherein said melt-processing comprises extrusion.

* * * * *

UNITED STATES PATENT AND TRADEMARK OFFICE
CERTIFICATE OF CORRECTION

PATENT NO. : 5,527,858
DATED : June 18, 1996
INVENTOR(S) : Thomas J. Blong and Claude Lavallée It is certified that error appears in the above-indentified patent and that said Letters Patent is hereby corrected as shown below:

Col. 3, line 32, delete "$(OR^x)_x$" and insert therefore --$(OR^1)_x$--.

Col. 3, line 48, after "hetero atoms" insert therefore --.--.

Signed and Sealed this

Seventh Day of January, 1997

Attest:

BRUCE LEHMAN

Attesting Officer

Commissioner of Patents and Trademarks